United States Patent
Joko

(10) Patent No.: US 9,830,671 B2
(45) Date of Patent: Nov. 28, 2017

(54) POWER MANAGEMENT SYSTEM, POWER MANAGEMENT METHOD, AND NETWORK SERVER

(75) Inventor: Shingo Joko, Kawasaki (JP)

(73) Assignee: Kyocera Corporation, Kyoto (JP)

( * ) Notice: Subject to any disclaimer, the term of this patent is extended or adjusted under 35 U.S.C. 154(b) by 585 days.

(21) Appl. No.: 14/347,216

(22) PCT Filed: Sep. 4, 2012

(86) PCT No.: PCT/JP2012/072507
§ 371 (c)(1),
(2), (4) Date: Mar. 25, 2014

(87) PCT Pub. No.: WO2013/047114
PCT Pub. Date: Apr. 4, 2013

(65) Prior Publication Data
US 2014/0236376 A1    Aug. 21, 2014

(30) Foreign Application Priority Data

Sep. 26, 2011   (JP) ................................. 2011-209956

(51) Int. Cl.
*G06Q 50/00* (2012.01)
*G06Q 50/06* (2012.01)
(Continued)

(52) U.S. Cl.
CPC ................ *G06Q 50/06* (2013.01); *H02J 3/14* (2013.01); *H02J 13/002* (2013.01);
(Continued)

(58) Field of Classification Search
CPC .......... G06Q 50/06; H02J 3/14; H02J 13/002; Y04S 20/224; Y04S 20/222; Y02B 70/3225
(Continued)

(56) References Cited

U.S. PATENT DOCUMENTS

2004/0133314 A1 *   7/2004   Ehlers ................. F24F 11/0012
                                                                    700/276
2009/0062970 A1     3/2009   Forbes, Jr. et al.
(Continued)

FOREIGN PATENT DOCUMENTS

JP    2009-124846 A    6/2009
JP    2010-128810 A    6/2010
(Continued)

OTHER PUBLICATIONS

Supplementary European Search Report dated Jun. 1, 2015 issued by the European Patent Office for Counterpart European Application No. EP 12 835 709.2.
(Continued)

*Primary Examiner* — Christopher E Everett
(74) *Attorney, Agent, or Firm* — Procopio Cory Hargreaves and Savitch LLP

(57) ABSTRACT

A power management system comprises a plurality of HEMSs 10 and CEMSs 40. The CEMS 40 receives, from each HEMS 10, power information including the amount of power consumed by a load connected to each HEMS 10. The CEMS 40 transmits, to each HEMS 10, reduction information including the amount of power that should be reduced in each consumer, in response to a curtailment signal and the power information.

12 Claims, 5 Drawing Sheets

(51) Int. Cl.
*H02J 3/14* (2006.01)
*H02J 13/00* (2006.01)

(52) U.S. Cl.
CPC .......... *Y02B 70/3225* (2013.01); *Y04S 20/222* (2013.01); *Y04S 20/224* (2013.01)

(58) Field of Classification Search
USPC ........................................................ 700/295
See application file for complete search history.

(56) References Cited

U.S. PATENT DOCUMENTS

| | | | |
|---|---|---|---|
| 2010/0088261 A1* | 4/2010 | Montalvo | H02J 3/14 706/15 |
| 2010/0141046 A1 | 6/2010 | Paik | |
| 2010/0145884 A1 | 6/2010 | Paik | |
| 2010/0314942 A1* | 12/2010 | Talkin | G06Q 50/06 307/41 |
| 2011/0060476 A1* | 3/2011 | Iino | H02J 3/14 700/297 |
| 2011/0184585 A1* | 7/2011 | Matsuda | G06F 1/26 700/297 |
| 2011/0184586 A1* | 7/2011 | Asano | G05B 15/02 700/297 |
| 2011/0196546 A1* | 8/2011 | Muller | H02J 3/383 700/295 |

FOREIGN PATENT DOCUMENTS

| | | |
|---|---|---|
| JP | 2010-176373 A | 8/2010 |
| JP | 2011-142753 A | 7/2011 |
| WO | 2010/065198 A2 | 6/2010 |

OTHER PUBLICATIONS

International Search Report; PCT/JP2012/072507; dated Oct. 23, 2012.

* cited by examiner

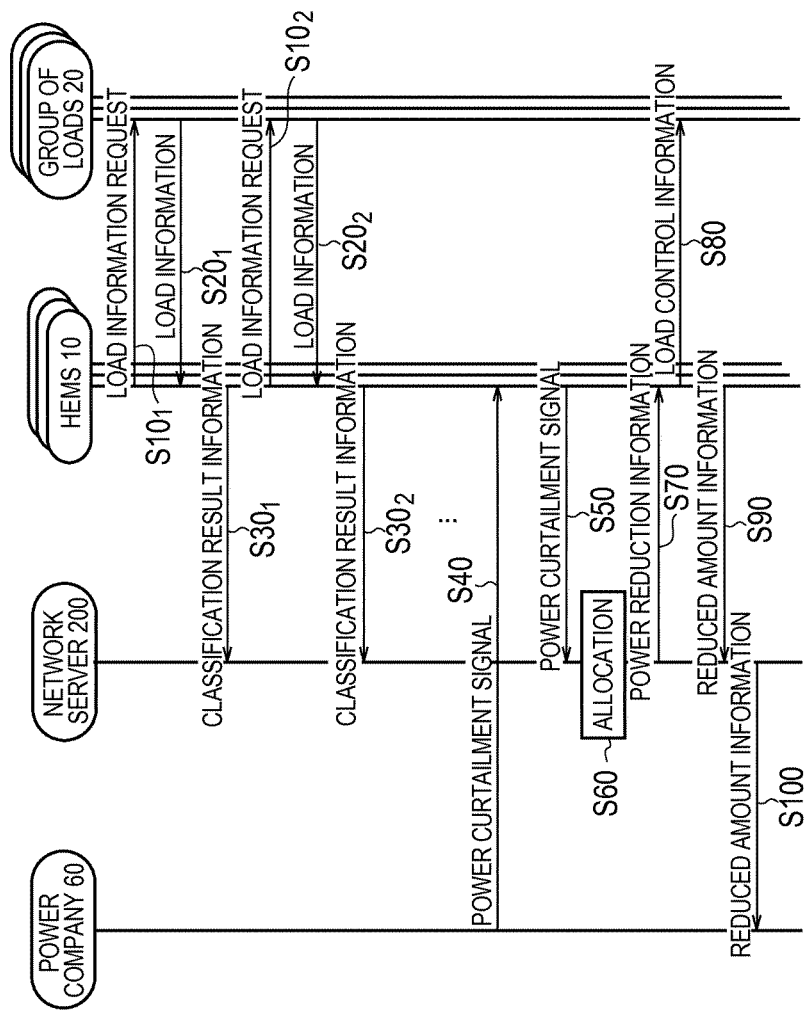

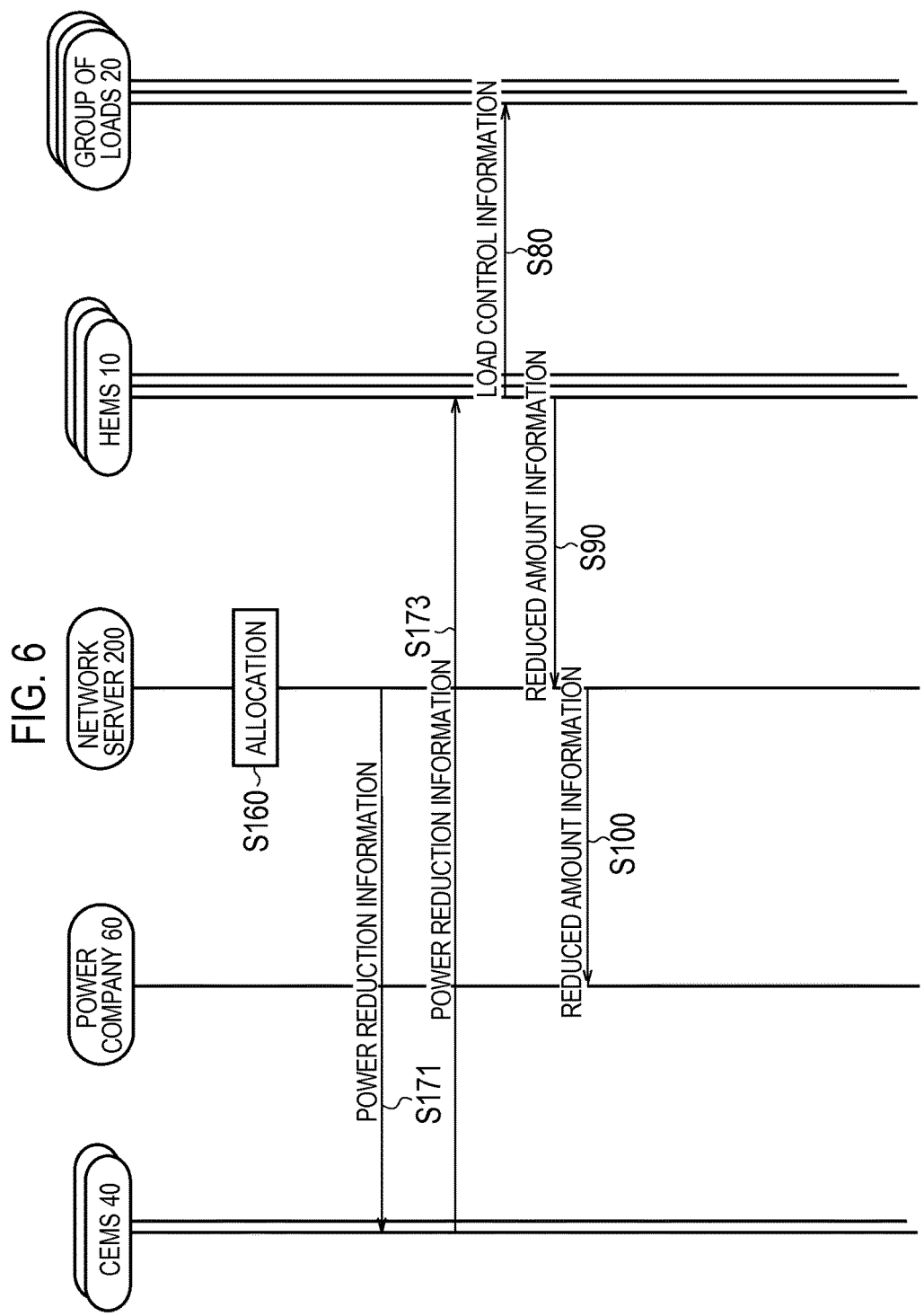

POWER MANAGEMENT SYSTEM, POWER MANAGEMENT METHOD, AND NETWORK SERVER

TECHNICAL FIELD

The present invention relates to a power management system, a power management method, and a network server that reduce power consumed by a load provided in a plurality of consumers.

BACKGROUND ART

In recent years, it is known a technology of controlling, by a power management apparatus (for example, HEMS: Home Energy Management System) provided in each consumer, a load provided in a consumer and a dispersed power source provided in a consumer, for example.

Examples of the dispersed power source may include a power generation equipment that utilizes clean energy such as sunlight, wind power, and geothermal energy. Alternatively, examples of the dispersed power source may also include a fuel cell such as SOFC (Solid Oxide Fuel Cell).

In such a system, when it is expected that an amount of power to be supplied from a power grid is smaller than a total amount of power consumed in a consumer connected to the power grid, a power company that manages the power grid transmits, to each power management apparatus, a power curtailment signal (DR: Demand Response) instructing restraint of an amount of power consumed, and each power management apparatus reduces power consumed by a load in response to the power curtailment signal (for example, Patent Literature 1). The power curtailment signal is a signal indicating an amount of power that should be reduced by each consumer (for example, a ratio of power to be reduced relative to power currently consumed, or an absolute value of power to be reduced relative to power currently consumed).

CITATION LIST

Patent Literature

Patent Literature 1: Japanese Patent Application Publication 2010-128810

SUMMARY OF THE INVENTION

In this case, from a viewpoint of a power company, it may suffice that the total amount of power consumed is reduced irrespective of an amount of power reduced by each consumer connected to the power grid. However, there is a need of considering situations of a plurality of consumers (power management apparatus).

Therefore, the present invention has been achieved in order to solve the above-described problem, and an object thereof is to provide a power management system, a power management method, and a network server with which it is possible to appropriately restrain an amount of power consumed by a load provided in each consumer.

A power management system according to the first feature comprises a plurality of power management apparatuses each of which is provided in each of a plurality of consumers and a network server connected to the plurality of power management apparatuses via a network. Each power management apparatus transmits, to the network server, power information including the amount of power consumed by a load connected to each power management apparatus and a curtailment signal transmitted from a power company that manages a power grid. The network server transmits, to each power management apparatus, reduction information including the amount of power that should be reduced in each consumer, in response to the curtailment signal and the power information.

In the first feature, each power management apparatus transmits, to the network server, the power information including an amount of power consumed for each category to which the load connected to each power management apparatus belongs.

In the first feature, each power management apparatus reduces power consumed by the load connected to each power management apparatus, in response to the reduction information received from the network server.

In the first feature, the curtailment signal includes the amount of power that should be reduced from an amount of power currently consumed by the load connected to the power grid.

In the first feature, the category has a priority, and the network server decides the amount of power that should be reduced in each consumer so as to preferentially reduce power consumed by a load belonging to a category having a lower priority.

In the first feature, the network server decides the amount of power that should be reduced in each consumer, in accordance with a coefficient corresponding to a contract of a maximum current value available for each consumer.

A power management method according to the second feature is applied to a power management system comprising a plurality of power management apparatuses each of which is provided in each of a plurality of consumers and a network server that manages the plurality of power management apparatuses. The power management method comprises: a step of transmitting, from each power management apparatus to the network server, power information including the amount of power consumed by a load connected to each power management apparatus and a curtailment signal transmitted from a power company that manages a power grid; and a step of transmitting, from the network server to each power management apparatus, reduction information including the amount of power that should be reduced in each consumer, in response to the curtailment signal and the power information. The curtailment signal includes the amount of power that should be reduced from an amount of power currently consumed by a load connected to the power grid.

In the second feature, in the step of transmitting the power information and the curtailment signal, the power information including an amount of power consumed for each category to which the load connected to each power management apparatus belongs is transmitted from each power management apparatus to the network server.

In the second feature, the power management method further comprises a step of reducing, in each power management apparatus, power consumed by the load connected to each power management apparatus, in response to the reduction information received from the network server.

A network server according to the third feature is connected to a plurality of power management apparatuses each of which is provided in each of a plurality of consumers via a network. The network server comprises: a reception unit that receives, from each power management apparatus, power information including the amount of power consumed by a load connected to each power management apparatus and a curtailment signal transmitted from a power company that manages a power grid; and a transmission unit that transmits, to each power management apparatus, reduction information including the amount of power that should be reduced in each consumer, in response to the curtailment signal and the power information transmitted from the power company that manages the power grid.

In the third feature, the reception unit receives, from each power management apparatus, the power information including an amount of power consumed for each category to which the load connected to each power management apparatus belongs.

In the third feature, the curtailment signal includes the amount of power that should be reduced from an amount of power currently consumed by the load connected to the power grid.

The present invention can provide a power management system, a power management method, and a network server with which it is possible to appropriately restrain an amount of power consumed by a load provided in each consumer.

BRIEF DESCRIPTION OF THE DRAWINGS

FIG. 5 is a sequence diagram showing a power management method according to the first embodiment.

FIG. 6 is a sequence diagram showing a power management method according to the first modification.

DESCRIPTION OF THE EMBODIMENT

Hereinafter, the power management system according to the embodiment of the present invention will be described. Note that the same or similar reference signs are applied to the same or similar portions in the following descriptions of the drawings.

It must be understood that the drawings are schematic, and the ratio of each dimension and the like may differ from the real one. Accordingly, specific dimensions and the like should be understood with reference to the following description. Furthermore, it must be understood that, the relationship or ratio of dimensions included in each of the drawings may differ.

[Summary of the Embodiment]

A power management system according to the embodiment comprises a plurality of power management apparatuses each of which is provided in each of a plurality of consumers and a network server connected to the plurality of power management apparatuses via a network. Each power management apparatus transmits, to the network server, power information including the amount of power consumed by a load connected to each power management apparatus and a curtailment signal transmitted from a power company that manages a power grid. The network server transmits, to each power management apparatus, reduction information including the amount of power that should be reduced in each consumer, in response to the curtailment signal and the power information.

Thus, the network server connected to the plurality of power management apparatuses via a network instructs each power management apparatus to reduce power, thereby making it possible to appropriately restrain the amount of power consumed by the load provided in each consumer.

[First Embodiment]

(Configuration of Power Management System)

Figure 1:
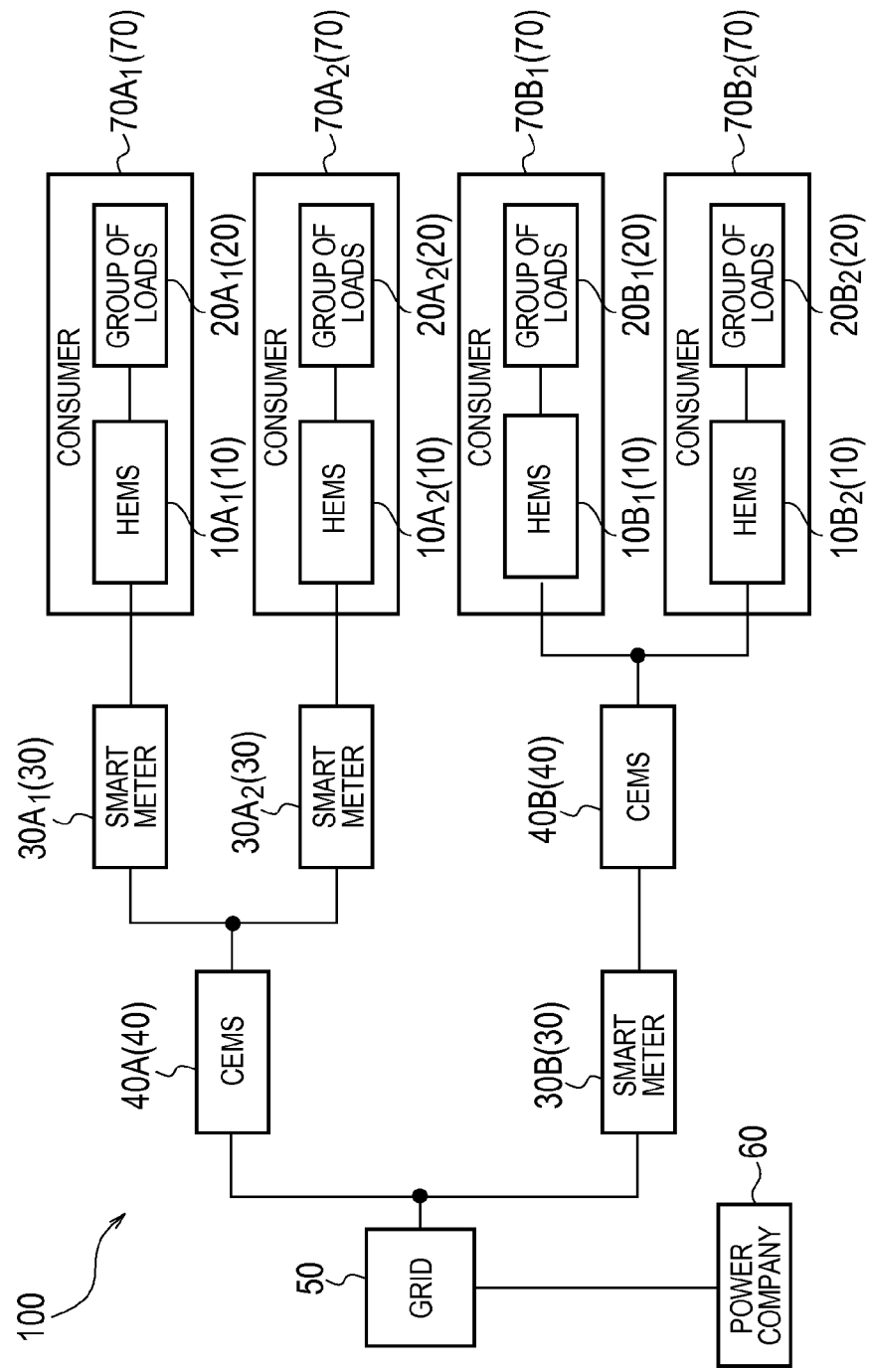
FIG. 1 is a diagram showing a power management system 100 according to the first embodiment.
Figure 2:
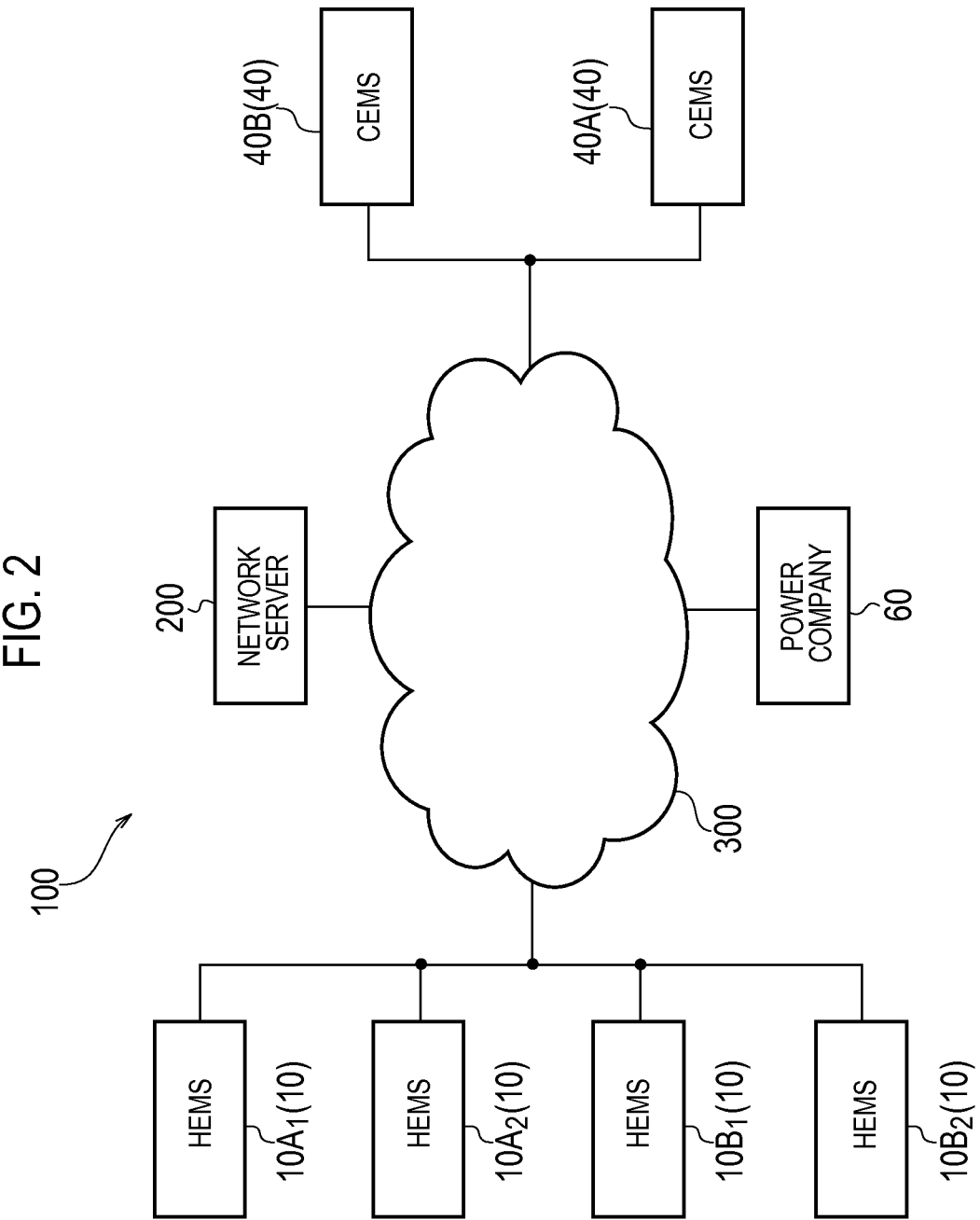
FIG. 2 is a diagram showing a power management system 100 according to the first embodiment.

Hereinafter, a power management system according to a first embodiment will be described. FIG. 1 and FIG. 2 are a diagram showing a power management system 100 according to the first embodiment.

Firstly, as shown in FIG. 1, the power management system 100 includes an HEMS 10, a group of loads 20, a smart meter 30, a CEMS 40, a grid 50, and a power company 60. The HEMS 10 and the group of loads 20 are provided within a consumer 70.

The HEMS 10 is an apparatus (HEMS: Home Energy Management System) that manages power of the consumer 70. In the first embodiment, the HEMS 10 includes a function of controlling the group of loads 20 by using a protocol such as ECHONET Lite or ZigBee. For example, the HEMS 10 is capable of controlling the power consumed by the group of loads 20 by controlling an operation mode of the group of loads 20.

In the first embodiment, as the HEMS 10, an HEMS $10A_1$ an HEMS $10A_2$, an HEMS $10B_1$, and an HEMS $10B_2$ are provided. Further, the HEMS 10 is an example of a power management apparatus. The HEMS 10 will be described in detail later (see FIG. 3).

The group of loads 20 is a group of equipment by which power is consumed. Examples of the group of loads 20 include equipment such as a refrigerator, lighting, an air conditioner, and TV. Further, a dispersed power source such as a storage battery, a photovoltaic power generation equipment (PV), and a fuel cell (SOFC) may be provided within the consumer 70.

In this case, it is possible to classify a load included in the group of loads 20 (that is, a load connected to the HEMS 10) into a plurality of categories. Further, each category has a priority.

For example, the load is classified into three categories (categories A to C). The category A is a category to which a load (for example, a refrigerator), for example, indispensable in a daily life, belongs. The category B is a load (for example, lighting and an air conditioner) directly related to a daily life, other than loads belonging to the category A. The category C is a load (for example, TV) not belonging to the category A nor the category B. In this case, the category A has the highest priority, and the category C has the lowest priority.

The category is basically set previously to each load; however, the category is preferably changeable by a user. For example, even when a category of a certain load is set as the category C at the time of product shipment, it is preferable that the category be changeable to another category depending on each usage manner of a user. The HEMS 10 stores information notifying the category to which the load belongs, periodically received from each load included in the group of loads 20, for example. Alternatively, when a category of a load included in the group of loads 20 is changed (for example, when a new load is added to the group of loads 20, or when the category of the load is changed), the HEMS 10 receives the information for notifying the change in category from the load and stores the information.

In the first embodiment, as the group of loads 20, a group of loads $20A_1$, a group of loads $20A_2$, a group of loads $20B_1$, and a group of loads $20B_2$ are provided. The HEMS $10A_1$ and the group of loads $20A_1$ are provided within a consumer $70A_1$, and the HEMS $10A_2$ and the group of loads $20A_2$ are provided within a consumer 70A$_2$. Likewise, the HEMS 10B$_1$ and the group of loads 20B$_1$ are provided within a consumer 70B$_1$, and the HEMS 10B$_2$ and the group of loads 20B$_2$ are provided within a consumer 70B$_2$.

Basically, the smart meter 30 is a meter that measures power consumed by the group of loads 20. In the first embodiment, the smart meter 30 includes a communication function, and is capable of receiving information from the HEMS 10, the CEMS 40, and the grid 50 (power company 60).

In the first embodiment, as the smart meter 30, a smart meter 30A$_1$, a smart meter 30A$_2$, and a smart meter 30B are provided. As shown in FIG. 1, the smart meter 30 may be provided closer to the grid 50 than the CEMS 40, or may be provided closer to the consumer 70 than the CEMS 40.

The CEMS 40 is an apparatus (CEMS: Community Energy Management System) that manages a plurality of HEMSs 10. The CEMS 40 collects information from each HEMS 10 and provides instructions for an operation to each HEMS 10.

In the first embodiment, as the CEMS 40, a CEMS 40A and a CEMS 40B are provided. Further, the CEMS 40 is an example of a power management apparatus.

The grid 50 is a power line for supplying each consumer 70 with power supplied from a power station, etc. The power company 60 is a business operator managing the grid 50.

The consumer 70 is a unit managed by one HEMS 10. For example, the consumer 70 may be a single house or a housing complex such as an apartment house. Alternatively, the consumer 70 may be a dwelling unit configuring a housing complex.

Secondly, as shown in FIG. 2, the power management system 100 has a network server 200. The network server 200 is connected to the plurality of power management apparatuses (the HEMSs 10 and the CEMSs 40) via a network 300. Further, the network server 200 is connected to the power company 60 via the network 300. The network 300 is, for example, an Internet network. Details of the network server 200 will be given below (see FIG. 4).

(Power Management Apparatus)

Figure 3:
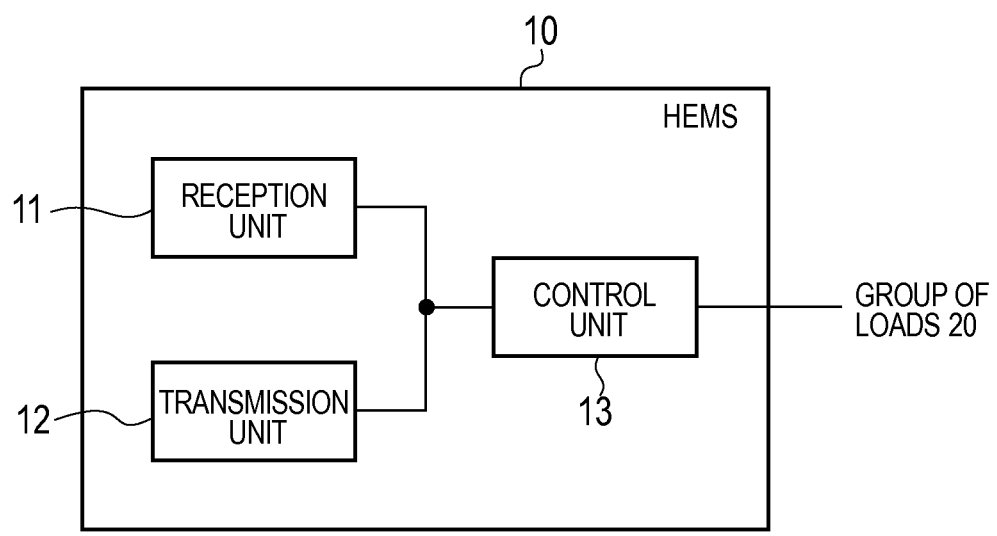
FIG. 3 is a block diagram showing the HEMS 10 according to the first embodiment.

Hereinafter, a power management apparatus according to the first embodiment will be described. FIG. 3 is a block diagram showing the HEMS 10 (an example of the power management apparatus) according to the first embodiment. As shown in FIG. 3, the HEMS 10 has a reception unit 11, a transmission unit 12, and a control unit 13.

The reception unit 11 receives various information from the network server 200 and the power company 60. Firstly, the reception unit 11 receives, from the power company 60, a power curtailment signal (DR; Demand Response) instructing restraint of the amount of power consumed. Secondly, the reception unit 11 receives, from the network server 200, reduction information including the amount of power that should be reduced in each consumer 70. In this case, it should be noted that the reduction information includes the amount of power to be reduced for each category.

The transmission unit 12 transmits various information to the network server 200. Firstly, the transmission unit 12 transmits, to the network server 200, the power curtailment signal (DR; Demand Response) received from the power company 60.

Secondly, the transmission unit 12 transmits, to the network server 200, classification result information (power information) including an amount of power consumed for each category to which a load connected to the HEMS 10 (a load included in the group of loads 20) belongs. In this case, the amount of power consumed included in the classification result information may be the amount of power that can be reduced for each category.

The amount of power that can be reduced for each category may be a numerical value manually input by a user, or a numerical value calculated by the HEMS 10 on the basis of a use history of a load stored in the HEMS 10. Alternatively, when a dispersed power source is provided within the consumer 70, the amount of power that can be reduced for each category may include not only the amount of power reduced by an operation suspension of a load but also the amount of power reduced that is achieved when the power supply from the grid 50 is reduced as a result of the group of loads 20 being supplied with output power from the dispersed power source.

Thirdly, the transmission unit 12 transmits, to the network server 200, reduced amount information indicating the amount of power reduced in accordance with the reduction information.

The control unit 13 comprehensively controls the HEMS 10. The control unit 13 controls the group of loads 20 connected to the HEMS 10 by using a signal that complies with a protocol such as ECHONET Lite or ZigBee. In particular, the control unit 13 is capable of controlling the power consumed by the group of loads 20 by controlling an operation mode of the group of loads 20. Specifically, the control unit 13 transmits, to the load included in the group of loads 20, a signal for switching to an operation mode in which it is possible to reduce the power consumed, in response to the reduction information received from the CEMS 40.

In this case, the control unit 13 grasps a category to which the load included in the group of loads 20 belongs. Further, the control unit 13 grasps power consumed by the load (power currently consumed) included in the group of loads 20.

When the dispersed power source is provided within the consumer 70, the control unit 13 grasps output power from the dispersed power source. Accordingly, when the power consumed by the group of loads 20 is reduced, the control unit 13 may not only stop the operation of the load but also replace at least a part of the power supplied to the group of loads 20 with the output power from the dispersed power source.

(Network Server)

Figure 4:
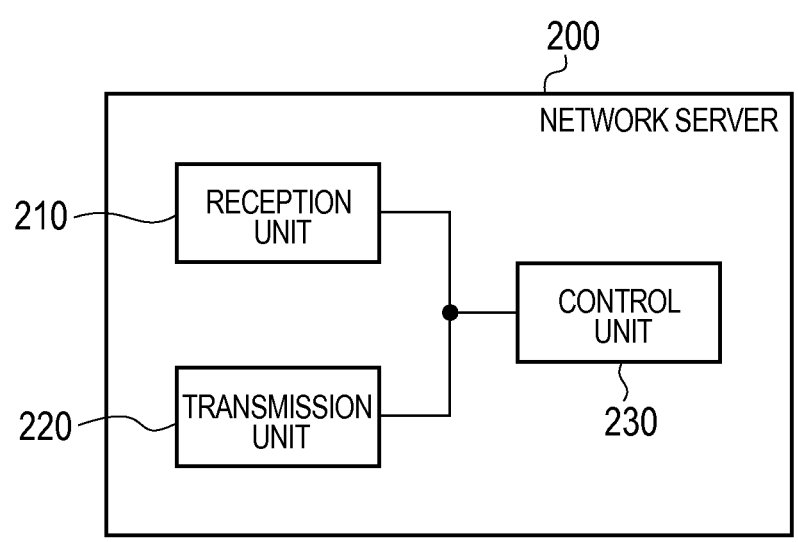
FIG. 4 is a block diagram showing the network server 20 according to the first embodiment.

Hereinafter, a network server according to the first embodiment will be described. FIG. 4 is a block diagram showing the network server 200 according to the first embodiment. As shown in FIG. 4, the network server 200 has a reception unit 210, a transmission unit 220, and a control unit 230.

The reception unit 210 receives various information from the HEMS 10. Firstly, the reception unit 210 receives, from each HEMS 10, the power curtailment signal (DR; Demand Response) instructing restraint of the amount of power consumed. It should be noted that an amount to be reduced designated by the power curtailment signal is the amount of power that should be reduced in each consumers 70.

Secondly, the reception unit 210 receives, from each HEMS 10, the classification result information including the amount of power consumed for each category to which the load connected to the HEMS 10 (the load included in the group of loads 20) belongs.

Thirdly, the reception unit 210 receives, from each HEMS 10, the reduced amount information indicating the amount of power reduced in accordance with the reduction information.

The transmission unit 220 transmits various information to the HEMS 10 and the power company 60. Firstly, the transmission unit 220 transmits, to each HEMS 10, the reduction information including the amount of power that should be reduced in each consumer 70. As described above, it should be noted that the reduction information includes the amount of power to be reduced for each category.

Secondly, the transmission unit 220 transmits, to the power company 60, the reduced amount information received from each HEMS 10.

The control unit 230 comprehensively controls the CEMS 40. Firstly, the control unit 230 determines whether or not power curtailment designated by the power curtailment signal is achieved, in response to the classification result information received from each HEMS 10. In particular, the control unit 230 determines whether or not the power curtailment is achieved by reduction in power consumed by the load in order from a category having a lower priority.

Secondly, the control unit 230 allocates the amount of power that should be reduced in each consumer 70 according to the classification result information including the amount of power consumed for each category.

For example, an amount of power to be reduced R(i) that should be reduced in a consumer (i), or HEMS (i), is calculated according to the following procedure, for example. In this case, as a category to which a load belongs, a case where the categories A to C exist is provided as an example.

Firstly, in a case where the power curtailment is achieved by reduction in power consumed by the load belonging to the category C, the amount of power to be reduced R(i) is calculated by the following Equation (1).

$$R(i) = P_C(i) \times c(i) \times PDR/P_C SUM$$

wherein $$\Sigma P_C(i) \times c(i) = P_C SUM, \text{ and } PDR \leq P_C SUM \quad \text{Equation (1)}$$

In this case, $P_C(i)$ denotes an amount of power that can be reduced (amount of power included in the classification result information) for a load belonging to the category C at the consumer (i). PDR denotes an amount of power to be reduced designated by the power curtailment signal, and specifically, denotes an amount of power that should be reduced in a whole of the plurality of consumers 70 provided under the CEMS 40. $P_C SUM$ is a sum of the amount of power that can be reduced for the load belonging to the category C, in a whole of the plurality of consumers 70 provided under the CEMS 40.

c(i) is a coefficient corresponding to a contract of a maximum current value available for the consumer (i). Preferably, the greater the contracted maximum current value is, the greater a value of c(i) is. It is noted that c(i) may be a constant value (for example, "1").

Secondly, in a case where the power curtailment is achieved by reduction in power consumed by the load belonging to the category C and the category B, the amount of power to be reduced R(i) is calculated by the following Equation (2).

$$R(i) = P_C(i) + P_B(i) \times b(i) \times (PDR - P_B SUM)/P_B SUM$$

wherein $$\Sigma P_B(i) \times b(i) = P_B SUM, \text{ and } PDR \leq P_C SUM + P_B SUM \quad \text{Equation (2)}$$

In this case, $P_B(i)$ denotes an amount of power that can be reduced (amount of power included in the classification result information) for a load belonging to the category B at the consumer (i). $P_B SUM$ is a sum of the amount of power that can be reduced for the load belonging to the category B, in a whole of the plurality of consumers 70 provided under the CEMS 40.

b(i) is a coefficient corresponding to a contract of a maximum current value available for the consumer (i). Preferably, the greater the contracted maximum current value is, the greater a value of b(i) is. It is noted that b(i) may be a constant value (for example, "1"). Further, b(i) may be the same in value as c(i), or may be different in value from c(i).

Thirdly, in a case where the power curtailment is not achieved by reduction in power consumed by the load belonging to the category C and the category B, the amount of power to be reduced R(i) is calculated by the following Equation (3).

$$R(i) = P_C(i) + P_B(i) + P_A(i) \times a(i) \times (PDR - P_C SUM - P_B SUM)/P_A SUM$$

wherein $$\Sigma P_A(i) \times a(i) = P_A SUM, \text{ and } P_C SUM + P_B SUM < PDR \quad \text{Equation (3)}$$

In this case, $P_A(i)$ denotes an amount of power that can be reduced (amount of power included in the classification result information) for a load belonging to the category A at the consumer (i). $P_A SUM$ is a sum of the amount of power that can be reduced for the load belonging to the category A, in a whole of the plurality of consumers 70 provided under the CEMS 40.

a(i) is a coefficient corresponding to a contract of a maximum current value available for the consumer (i). Preferably, the greater the contracted maximum current value is, the greater a value of a(i) is. It is noted that a(i) may be a constant value (for example, "1"). Further, a(i) may be the same in value as c(i) or b(i), or may be different in value from c(i) or b(i).

(Power Management Method)

Hereinafter, the power management method according to the first embodiment will be described. FIG. 5 is a sequence diagram showing an operation of the power management system 100 according to the first embodiment.

As shown in FIG. 5, in step $10_1$, each HEMS 10 transmits, to each group of loads 20, a load information request for requesting the power consumed by the load (the power currently consumed) included in the group of loads 20.

In step $20_1$, each HEMS 10 receives, from the group of loads 20, load information including the power consumed by the load included in the group of loads 20 (the power currently consumed). In this case, it should be noted that the load information includes the amount of power consumed for each category.

In step $30_1$, the network server 200 receives, from each HEMS 10, the classification result information including the amount of power consumed for each category to which the load connected to the HEMS 10 (the load included in the group of loads 20) belongs.

In this case, it is noted that processes of step $10_2$ to step $30_2$ are similar to the processes of step $10_1$ to step $30_1$. That is, the network server 200 periodically receives the classification result information from each HEMS 10.

In step 40, each HEMS 10 receives, from the power company 60, the power curtailment signal (DR; Demand Response) instructing restraint of the amount of power consumed.

In step 50, the network server 200 receives, from each HEMS 10, the power curtailment signal (DR; Demand Response).

In step 60, the network server 200 allocates the amount of power that should be reduced in each consumer 70, in accordance with the classification result information including the amount of power consumed for each category.

For example, in a case where the power curtailment is achieved by reduction in the power consumed by the load belonging to the category C (that is, in a case where PDR≤$P_C$SUM is satisfied), the amount of power to be reduced R(i) is calculated by the following Equation (1).

$$R(i)=P_C(i) \times c(i) \times PDR/P_C SUM$$

wherein $$\Sigma P_C(i) \times c(i) = P_C SUM \qquad \text{Equation (1)}$$

In a case where the power curtailment is achieved by reduction in the power consumed by the load belonging to the category C and the category B (that is, in a case where PDR≤$P_C$SUM+$P_B$SUM is satisfied), the amount of power to be reduced R(i) is calculated by the following Equation (2).

$$R(i)=P_C(i)+P_B(i) \times b(i) \times (PDR-P_C SUM)/P_B SUM$$

wherein $$\Sigma P_B(i) \times b(i) = P_B SUM \qquad \text{Equation (2)}$$

In a case where the power curtailment is not achieved by reduction in the power consumed by the load belonging to the category C and the category B (that is, in a case where $P_C$SUM+$P_B$SUM<PDR is satisfied), the amount of power to be reduced R(i) is calculated by the following Equation (3).

$$R(i)=P_C(i)+P_B(i)+P_A(i) \times a(i) \times (PDR-P_C SUM-P_B SUM)/P_A SUM$$

wherein $$\Sigma P_A(i) \times a(i) = P_A SUM \qquad \text{Equation (3)}$$

In step 70, the network server 200 transmits, to each HEMS 10, the reduction information including the amount of power that should be reduced in each consumer 70. It should be noted that the reduction information includes the amount of power to be reduced for each category.

In step 80, each HEMS 10 reduces the power consumed by the load included in the group of loads 20, in response to the reduction information received from the network server 200.

In step 90, the network server 200 receives, from each HEMS 10, the reduced amount information indicating the amount of power reduced in accordance with the reduction information.

In step 100, the network server 200 transmits, to the power company 60, the reduced amount information received from each HEMS 10.

In the first embodiment, the network server 200 connected to the plurality of HEMSs 10 via the network 300 transmits the reduction information to each HEMS 10, in response to the classification result information received for each category having a priority.

The amount of power that can be reduced depends on each consumer. Further, some consumers usually try to save power, and other consumers do not usually try to save power. Thus, when reduction in power consumed is requested uniformly to consumers, the sense of unfairness arises among the consumers. Thus, the network server 200 connected to the plurality of HEMSs 10 via the network 300 allocates the amount of power to be reduced in each consumer 70 in consideration of the amount of power that should be reduced in a whole of the consumers 70 and the amount of power that can be reduced for each consumer 70, and it is thus possible to restrain a senses of unfairness among the respective consumers.

On the other hand, the power company 60 does not need to consider the amount of power that can be reduced for each consumer 70, and may just designate, to the HEMS 10, the amount of power that should be reduced in each consumer 70. That is, the power company 60 does not need power usage information of each consumer 70, and thus, the power company 60 does not need to bear a burden required for managing the power usage information of each consumer 70, either. It is not necessary for the consumer 70 to provide the power company 60 with power usage information of the consumer 70, either, which is preferable in view of privacy protection.

If it is difficult to achieve a target amount to be reduced (for example, 10%), then the power company 60 may transmit a power curtailment signal indicating a larger amount to be reduced (for example, 15%) to reduce total power currently consumed by the target amount to be reduced in a whole of the plurality of consumers 70. However, because of allocating the amount of power to be reduced, that is, the amount that can be reduced for each consumer 70, the network server 200 is capable of highly certainly achieving the target amount to be reduced. Thus, the power company 60 does not also need to increase the amount to be reduced designated by the power curtailment signal to be larger than the target amount to be reduced.

As described above, according to the power management system 100 of the embodiment, it is possible to appropriately restrain the amount of power consumed by the load provided in each consumer.

Further, the reduction information is transmitted in response to the classification result information including the amount of power consumed for each category having a priority, and thus, power consumed by a load belonging to a category having a lower priority is reduced first in an orderly manner. As a result, reduction in power that should be supplied to a load belonging to a category having a higher priority, that is, a load necessary for a daily life, is restrained.

(First Modification)

A description will be given below of a first modification of the first embodiment. Differences from the first embodiment are mainly described, below.

In the first embodiment, the network server 200 directly transmits the reduction information to each HEMS 10. On the other hand, in the first modification, the network server 200 transmits the reduction information to the CEMS 40.

In particular, in the first modification, the network server 200 allocates the amount of power that should be reduced in each consumer 70 provided under each CEMS 40, in accordance with the classification result information including the amount of power consumed for each category.

Each CEMS 40 may allocate the amount of power that should be reduced in each consumer 70. In such a case, the network server 200 allocates the amount of power to be reduced for each CEMS 40. In other words, the network server 200 allocates, to each CEMS 40, the total amount of power that should be reduced at the consumers 70 provided under the CEMS 40, and entrusts each CEMS 40 to allocate the amount of power that should be reduced in each consumer 70.

(Power Management Method)

Hereinafter, a power management method according to the first modification will be described. FIG. 6 is a sequence diagram showing an operation of the power management system 100 according to the first modification. In FIG. 6, a description of step $10_1$ to step 50 shown in FIG. 5 is omitted to simplify explanation. Further, in FIG. 6, step 160, step 171, and step 173 are provided in place of step 60 and step 70 compared with a sequence shown in FIG. 5.

As shown in FIG. 6, the network server 200 allocates the amount of power that should be reduced in each consumer 70 provided under each CEMS 40, in accordance with the classification result information including the amount of power consumed for each category. The allocation of the amount of power to be reduced is basically similar to that of the first embodiment.

Further, as described above, the network server 200 may allocate, to each CEMS 40, the total amount of power that should be reduced at the consumers 70 provided under the CEMS 40, and entrust each CEMS 40 to allocate the amount of power that should be reduced in each consumer 70.

In step 171, the network server 200 transmits, to each CEMS 40, the reduction information including the amount of power that should be reduced at the consumers 70 provided under each CEMS 40. It should be noted that the reduction information includes the amount of power to be reduced for each category.

In step 173, each CEMS 40 transmits, to the HEMS 10, the reduction information including the amount of power that should be reduced in each consumer 70, in response to the reduction information received from the network server 200.

[Other Embodiments]

The present invention has been described according to the aforementioned embodiment. It must not be understood that, however, the discussions and the drawings constituting apart of this disclosure limit the present invention. From this disclosure, various alternative embodiments, examples and operational techniques will be apparent to those skilled in the art.

In the embodiment, the HEMS 10 is employed as an example of the power management apparatus; however, the embodiment is not limited thereto. The power management apparatus may be the CEMS 40. Alternatively, the power management apparatus may be a BEMS (Building and Energy Management System) or a FEMS (Factory Energy Management System), for example.

In the embodiment, the network server 200 periodically receives, from each consumer 70 (HEMS 10), the classification result information including the amount of power consumed for each category. However, the embodiment is not limited thereto. For example, the network server 200 may request each consumer 70 (HEMS 10) to transmit the classification result information in response to the power curtailment signal (DR; Demand Response).

Note that the entire content of the Japanese Patent Application No. 2011-209956 (filed on Sep. 26, 2011) is incorporated herein by reference.

INDUSTRIAL APPLICABILITY

The present invention can provide a power management system, a power management method, and a network server with which it is possible to appropriately restrain an amount of power consumed by a load provided in each consumer.

The invention claimed is:

1. A power management system comprising:
a plurality of power management apparatuses each of which is provided in one of a plurality of consumers; and
a network server connected to the plurality of power management apparatuses via a network,
wherein each of the plurality of power management apparatuses comprises
a receiver configured to receive a curtailment signal directly from a power company that manages a power grid without being relayed by the network server, and
a transmitter configured to transmit the curtailment signal to the network server via the network,
wherein the network server comprises
a receiver configured to receive the curtailment signal relayed by each of the plurality of power management apparatuses, and
a transmitter configured to transmit, to each of the plurality of power management apparatuses, reduction information including an amount of power that should be reduced in each consumer, in response to the received curtailment signal, and
wherein each of the plurality of power management apparatuses is configured to reduce power consumed by a load connected to that power management apparatus, in response to the reduction information received from the network server.

2. The power management system according to claim 1, wherein each of the plurality of power management apparatuses is configured to transmit, to the network server, power information including an amount of power consumed for each category to which the load connected to that power management apparatus belongs.

3. The power management system according to claim 1, wherein the curtailment signal includes an amount of power that should be reduced from an amount of power currently consumed by loads connected to the plurality of power management apparatuses.

4. The power management system according to claim 3, wherein each category has a priority, and the network server is configured to decide the amount of power that should be reduced in each consumer so as to preferentially reduce power consumed by a load belonging to a category having a lower priority.

5. The power management system according to claim 3, wherein the network server is configured to decide the amount of power that should be reduced in each consumer, in accordance with a coefficient corresponding to a contract of a maximum current value available for each consumer.

6. The power management system according to claim 1,
wherein each of the plurality of power management apparatuses is further configured to transmit, to the network server via the network, power information including the amount of power consumed by a load connected to that power management apparatus, in addition to the curtailment signal, and
wherein the network server is further configured to determine the amount of power that should be reduced in each consumer based on the power information received from the plurality of power management apparatuses.

7. A power management method applied to a power management system comprising a plurality of power management apparatuses, each of which is provided in one of a plurality of consumers, and a network server that manages the plurality of power management apparatuses, the method comprising:
receiving, by a receiver of each of the plurality of power management apparatuses, a curtailment signal directly from a power company that manages a power grid without being relayed by the network server;

transmitting, from a transmitter of each of the plurality of power management apparatuses to the network server, the curtailment signal;

receiving, by a receiver of the network server, the curtailment signal relayed by each of the plurality of power management apparatuses;

transmitting, from a transmitter of the network server to each of the plurality of power management apparatuses, reduction information including an amount of power that should be reduced in each consumer, in response to the received curtailment signal; and reducing, in each of the plurality of power management apparatuses, power consumed by a load connected to that power management apparatus, in response to the reduction information received from the network server.

8. The power management method according to claim 7, further comprising transmitting, from each of the plurality of power management apparatuses to the network server, power information including an amount of power consumed for each category to which a load connected to that power management apparatus belongs.

9. The power management method according to claim 7, further comprising:

transmitting, from each of the plurality of power management apparatuses to the network server, power information including the amount of power consumed by a load connected to that power management apparatus, in addition to the curtailment signal; and determining, by the network server, the amount of power that should be reduced in each consumer based on the power information received from the plurality of power management apparatuses.

10. A network server connected to a plurality of power management apparatuses, each of which is provided in one of a plurality of consumers via a network, the network server comprising:

a receiver configured to receive, from each of the plurality of power management apparatuses, a curtailment signal relayed by each power management apparatus received from a power company that manages a power grid; and a transmitter configured to transmit, to each of the plurality of power management apparatuses, reduction information including an amount of power that should be reduced in each consumer, in response to the received curtailment signal, such that each power management apparatus responsively reduces power consumed by a load connected to that power management apparatus.

11. The network server according to claim 10, wherein the receiver receives, from each of the plurality of power management apparatuses, power information including an amount of power consumed for each category to which the load connected to that power management apparatus belongs.

12. The network server according to claim 11, wherein the curtailment signal includes an amount of power that should be reduced from an amount of power currently consumed by loads connected to the plurality of power management apparatuses.

\* \* \* \* \*